United States Patent Office 3,563,907
Patented Feb. 16, 1971

3,563,907
STORAGE STABLE LIQUID COMPOSITIONS
USEFUL AS CURATIVES
Herbert G. Nadeau, North Haven, and Paul H. Waszeciak, Guilford, Conn., assignors to The Upjohn Company, Kalamazoo, Mich., a corporation of Delaware
No Drawing. Filed Nov. 17, 1967, Ser. No. 684,484
Int. Cl. C09k 3/00; C08g 33/14
U.S. Cl. 252—182                  5 Claims

ABSTRACT OF THE DISCLOSURE

Novel storage stable liquid compositions are prepared by admixing two normally solid primary polyamines; namely, methylene polyphenyl polyamines and hexamethylene diamine. The mixture of polyamines remains liquid at temperatures above 5° C. The novel mixtures of polyamines can be used as epoxy resin curatives, polyurethane extenders and for all purposes for which the individual components are conventionally employed.

BACKGROUND OF THE INVENTION

(1) Field of the invention

This invention relates to novel mixtures of primary polyamines and is more particularly concerned with the storage stable liquid mixtures prepared by the admixture of methylene polyphenyl polyamines and a minor proportion of hexamethylene diamine which mixtures remain liquid at temperatures above 5° C., and with the polymers derived therefrom.

(2) Description of the prior art

Various epoxy resin curatives are currently available commercially such as carboxylic acids or anhydrides, Friedel-Crafts metal halides and amino compounds with each having specific properties for specific applications. The most generally used epoxy curatives are the various amines such as triethylamine, diethylene triamine, triethylene diamine, triethylene tetramine, pyridine, dicyandiamide, isomers of phenylene diamine, and isomers of methylene dianiline. The most preferred amines are the primary aromatic polyamines such as methylene dianiline, because of the superior high temperature and electrical properties which are conferred upon the polymers cured therewith. Although the aromatic amine curatives impart distinctly higher heat distortion temperatures than the aliphatic amine curatives, they are relatively high melting solids. Thus, in order to incorporate the aromatic amine curatives into the epoxy resins the amine must first be melted. This has presented handling and storage problems. When massive epoxy resin castings are made, the use of molten curatives has also resulted in uncontrollable exothermic reactions. On the other hand, when used in curing epoxy resins in thin layers such as laminating resins, adhesives, etc., the aromatic amines exhibit a low level of reactivity. This low level of activity requires long curing cycles for optimal polymer properties.

The liquid aliphatic amine compounds such as triethylene tetramine have been found to be particularly useful as epoxy resin curatives since these curatives can be mixed with most epoxy resins at room temperatures. However, the polymers cured with aliphatic amines exhibit significantly shorter working times as compared with the aromatic amines and the electrical and high temperature properties of the cured resins are also much lower.

Numerous attempts have been made to prepare liquid curatives having the short curing cycles of the aliphatic amines and yet retaining the desirable high temperature and electrical properties of the cured resins obtained when using the aromatic amines. Illustratively, liquid curatives have been prepared by reacting monoepoxides with aromatic amines as described in U.S. Patent 2,938,004 or by reacting a tertiary aminophenol with primary polyamines as disclosed in U.S. Patent 3,837,497. Unfortunately, these liquid curatives are prepared at the expense of reducing the functionality of the curative and result in polymers with a lower degree of crosslinking.

Liquid eutectic mixtures of two or more aromatic amines have been made as described in U.S. Patents 2,853,467, 2,891,927, and 2,904,503. However, the epoxy resins cured with these eutectic mixtures suffer the shortcomings of a long curing cycle inherent with the aromatic amine curatives.

SUMMARY OF THE INVENTION

This invention makes available for the first time a storage stable liquid curative composition in which are combined the desirable characteristics of the aromatic amine curatives namely, the ability to confer high temperature properties on the cured resins, and the desirable liquid characteristics of the aliphatic amine curatives. Additionally, the novel compositions of the invention exhibit a relatively higher order of reactivity and consequently require shorter cure cycles than the aromatic amine curatives from which the compositions of the invention are prepared.

Thus, in its broadest aspect, this invention relates to a novel composition which is liquid on storage at temperatures above 5° C., said composition comprising a mixture of (a) from about 10 to about 40 percent by weight of hexamethylene diamine and (b) from about 90 to about 60 percent by weight of a mixture of methylene polyphenyl polyamines containing from about 35 to about 85 percent by weight of methylene dianilines, the remainder of said mixture of polyamines being triamines and polyamines of higher molecular weight.

DETAILED DESCRIPTION OF THE INVENTION

The finding that the compositions of the invention are liquid is indeed surprising since each of the starting amino compounds is a solid at room temperature (circa 20°–30° C.). Even more surprising and unexpected are the high temperature and electrical properties of the resultant polymers cured with the novel compositions of the invention. Since it is known that the resins cured with the aromatic amines exhibit significantly higher thermal and electrical resistance than the aliphatic amine curatives, one would expect polymers cured with mixtures thereof to exhibit properties proportionally lower than the parent aromatic amine. However, contrary to this expectation we have found that the polymers cured with the storage stable liquid compositions of the invention exhibit all the desirable physical properties obtained when using the starting aromatic amine curatives plus the desirable liquid handling characteristics and shorter cure cycles of the aliphatic amine curatives.

The methylene polyphenyl polyamines used in preparing the storage stable compositions of the invention are mixtures of methylene-bridged polyphenyl polyamines containing from about 35 to about 85 percent by weight of isomeric methylene dianilines, the remainder of said methylene-bridged polyphenyl polyamine being triamines and polyamines of higher molecular weight. These mixtures of methylene-bridged polyphenyl polyamines are known in the art or can be prepared by methods well-known in the art, such as, by mixing aqueous formaldehyde solutions with mixtures of aniline and hydrochloric acid, see for example, Wagner, Journal American Chemical Society, 56, 1944–1946 (1934); U.S. Patent 2,950,263 and German Patent 1,131,877 or by mixing aniline with mixtures of hydrochloric acid and aqueous formaldehyde solutions, see for example, U.S. Patent 2,683,730. The composition of a particular methylene polyphenyl polyamine mixture depends upon the ratio of aniline to formaldehyde used to produce it. Thus, it has been reported that polyphenyl polyamine mixtures containing 35 to 85 percent by weight of methylene dianilines are produced by reacting aniline and formaldehyde in the molar ratios of 4 to 2.5 and 4 to 1 respectively, see for example, U.S. Patents 2,683,730, and 2,950,263. The overall composition of the methylene-bridged polyphenyl polyamines which are described above can be represented by the generic formula:

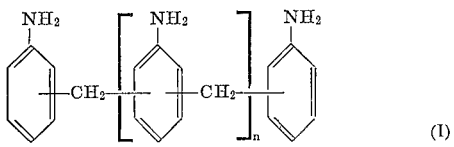

(I)

wherein $n$ has an average value equal to or greater than 0.1 (corresponding to about 85 percent by weight diamine) but not greater than one (corresponding to about 35 percent by weight diamine). The preferred methylene polyphenyl polyamine for use in the storage stable liquid compositions of the invention contains about 50 percent methylene dianilines which corresponds to a value of $n$ in the above formula of about 0.7.

The amount of hexamethylene diamine employed in the preparation of the storage stable liquid compositions of the invention must be at least 10 percent by weight based on the total weight of the compositions. The upper limit of hexamethylene diamines employed in the liquid compositions of the invention is dictated largely by economics and by the type of mehylene polyphenyl polyamine used in the mixture. That is the compositions of the invention in which the methylene-bridged polyphenyl polyamine component contains 50 percent or less by weight of methylene dianilines should contain at least 10 percent by weight of hexamethylene diamine based on the total weight of the mixture. Compositions of the invention in which the methylene polyphenyl polyamine component contains greater than 50 percent by weight of methylene dianilines should contain at least 20 percent by weight of hexamethylene diamine based on the total weight of the mixture. We have found that a practical and economical upper limit of hexamethylene diamine is of the order of about 40 percent by weight based on the total weight of the mixture. Generally speaking, however, proportions of hexamethylene diamine within the range of from about 15 percent by weight to about 30 percent by weight based on the total weight of the mixture are preferred.

Preparation of the liquid compositions of the invention is carried out by bringing together, in any convenient manner, the appropriate methylene polyphenyl polyamine mixture and the hexamethylene diamine. The method of mixing is not critical. For example, the two polyamines can be admixed in the solid state and the resulting mixture subjected to heat to achieve melting to a homogeneous liquid state. Alternatively, the amines can be melted separately and the molten amies can be mixed in the appropriate proportions to give a homogeneous liquid.

The storage stable liquid compositions of the invention can be used for all purposes for which the methylene polyphenyl polyamine starting materials are generally used. Thus the liquid primary polyamines of the invention can be used as curatives in the preparation of thermosetting epoxy resin polymers. Such epoxy polymers include those which are commonly used as adhesives, coatings, laminating resins for fibrous materials, paper, etc. and as molding compositons for molded articles.

Methods for preparing these various compositions are well-known in the art; see, for example, Lee et al., Epoxy Resins, McGraw-Hill Book Company, Incorporated, New York (1957). When preparing thermo-setting epoxy polymers, the novel liquid compositions of the invention are generally employed in an amount of from about 0.75 equivalent to about 1.20 equivalents per equivalent of epoxy resin. Generally speaking, however, the liquid compositions of the invention are preferably employed within a range of from about 0.90 equivalent to about 1.05 equivalents per equivalent of epoxy resin.

Surprisingly, the epoxy polymers cured with the liquid compositions of the invention exhibit comparable electrical and thermal properties to epoxy resins cured with equivalent amounts of the parent methylene polyphenyl polyamines alone, i.e. free from hexamethylene diamine. However, the cure cycle times required with the compositions of the invention are significantly less than those required with the starting methylene polyphenyl polyamine alone.

The following examples describe the methods of making and using the novel compositions of the invention and set forth the best mode contemplated by the inventors of carrying out the invention but are not to be construed as limiting. All parts are given by weight except where otherwise indicated.

EXAMPLE 1

This example illustrates the preparation of a storage stable liquid composition of the invention.

Preparation of the starting methylene polyphenyl polyamines

The methylene polyphenyl polyamine starting material was prepartd as follows:

Following the procedure of U.S. Patent 2,950,263, four moles of aniline and 2.26 moles of 37 percent aqueous formaldehyde were reacted in the presence of 2.2 moles of hydrochloric acid. The resultant methylene polyphenyl polyamine, designated "Curative A," had an amine equivalent weight of 104, an $n$ value in the above Formula I of approximately 0.7, and contained approximately 50 percent by weight of methylene dianilines, the remainder being triamines and polyamines of higher molecular weight.

Employing the same reaction procedures but varying the proportions of aniline, formaldehyde, and hydrochloric acid (HCl) as shown in the following table there are obtained other methylene polyphenyl polyamine starting materials having the percentages of methylene dianiline (MDA) shown in said table.

TABLE I

| Molecular proportions | | | MDA content, percent |
|---|---|---|---|
| Aniline | Formaldehyde | HCl | |
| 4.0 | 1.0 | 1.0 | 83 |
| 4.0 | 2.3 | 1.35 | 45 |
| 4.0 | 2.55 | 2.2 | 40 |

Preparation of a liquid curative composition of the invention

Eighty parts of the methylene polyphenyl polyamine, designated "Curative A" and prepared as described above, were charged to a reaction flask equipped with a thermometer, stirring apparatus and heating mantle. The contents of the flask were heated to approximately 80° C. with stirring. Once the methylene polyphenyl polyamine was completely melted 20 parts of hexamethylene diamine were added with stirring. Agitation of the mixture was continued for approximately 20 minutes and allowed to cool to room temperature (circa 25° C.). The resultant liquid composition, designated "Curative B," had the following physical properties:

TABLE II

Appearance: Dark brown liquid
Viscosity at 23° C.: 1.300 cps.
Density at 25° C.: 1.386 gm./ml.
Refractive Index at 25° C.: 1.6170
Pour point: −11° C.
Amine equivalent weight: 91
Active hydrogen equivalent weight: 45.5

The above composition remained liquid on storage for at least 60 days at approximately 25° C.

Similarly, using the procedure described above but replacing the methylene polyphenyl polyamine "Curative A" by an equivalent amount of any of the polyamines shown in Table I above, there are obtained liquid polyamine compositions of the invention.

EXAMPLE 2

Following the procedure of Example 1, and using the methylene polyphenyl polyamines designated "Curative A," a storage stable liquid composition of the invention was prepared using the ingredients and proportions set forth in Table III below:

TABLE III

Ingredients: Parts
"Curative A" _____ 90
Hexamethylene diamine _____ 10

The resultant liquid polyamine, designated "Curative C," had a pour point of 5° C., a viscosity of 9,860 centipoise at 23° C., and an active hydrogen equivalent weight of 48.3. This composition remained liquid on storage for at least 60 days at approximately 25° C.

EXAMPLE 3

Preparation of the starting methylene polyphenyl polyamine

Following the procedure of Example 1, first part, but employing four moles of aniline, two moles of 37 percent aqueous formaldehyde and two moles of hydrochloric acid, there was obtained a methylene polyphenyl polyamine mixture, designated "Curative D." This polyamine mixture had an amine equivalent weight of 101, an $n$ value in the above Formula I of approximately 0.2, and contained approximately 68 percent by weight of methylene dianilines, the remainder being triamines and polyamines of higher molecular weight.

Preparation of a liquid curative composition of the invention

Employing the procedure of the second part of Example 1 a liquid composition of the invention was prepared by mixing sixty parts of "Curative D" (prepared as described above) and forty parts of hexamethylene diamine. The resultant liquid composition, designated "Curative E," had a viscosity of approximately 100 centipoises at 25° C. and an active hydrogen equivalent weight of 31. This composition remained liquid at least one month at 25° C.

The following examples illustrate the use of the liquid polyamine compositions of the invention in the preparation of epoxy resin thermoset polymers.

EXAMPLE 4

One hundred parts (0.529 equivalent) of an epoxy resin made by the condensation of bisphenol A and epichlorohydrin (DER–331; average epoxide equivalent weight 189; Dow Chemical Company, Midland, Mich., Technical Bulletin 170–141A) were mixed at room temperature with 24.1 parts (0.529 equivalent) of "Curative B" of Example 1. The mixture was heated to 40° C. and degassed in a desiccator until bubbling stopped. The mixture was cast into a Teflon® lined aluminum baking pan measuring 7" x 7" x 2" and placed in a 100° C. oven for one hour, followed by two hour cure at 150° C. The resultant clear amber casting measuring 7" x 7" x ¼" was tested after aging 24 hours at room temperature and was found to exhibit the physical properties set forth in Table IV using the indicated test methods.

TABLE IV

| Physical properties | | ASTM test method |
|---|---|---|
| Compressive strength, p.s.i. | 17,600 | D 695–54 |
| Flexural strength, p.s.i. | 12,400 | D 790–58T |
| Flexural modulus | 3.13×10⁵ | D 790–58T |
| Rockwell hardness, M | 108 | D 785–60 |
| Clash Berg modulus, ° C. $T_E=5\times10^4$ | 141.9 | D 1043–61 |
| Heat distortion temperature, ° C. | 302 | D 648–56 |
| Dielectric constant 1 megacycle, 73° F. | 3.85 | D 150–59T |
| Dissipation factor 1 megacycle, 13° C. | 0.040 | D 150–59T |

EXAMPLE 5

Two epoxy castings were prepared according to the procedure of Example 3 one casting employing as curative the methylene polyphenyl polyamine mixture designated "Curative A" of Example 1 and the other casting employing as curative the composition of the invention designated "Curative C" of Example 2. The physical properties of the resultant casting were determined (after aging 24 hours at room temperature) using the test procedures set forth in Example 4.

TABLE V

| Materials | Casting (a) | Casting (b) |
|---|---|---|
| DER–334 [1] | 100 | 100 |
| Curative A | 28.3 | |
| Curative C | | 26.5 |
| Flexural strength, p.s.i. | 17,200 | 17,000 |
| Flexural modulus, (×10⁵) | 4.36 | 3.90 |
| Clash berg modulus, ° C., $T_E=5\times10^4$ | 111 | 110.5 |
| Shore hardness, D | 88 | 90 |

[1] DER–334, a mixture of 89% of the reaction product of bisphenol A/epichlorohydrin and 11% of butyl glycidyl ether; average epoxide equivalent weight 187; Dow Chemical Company, Midland, Michigan, Technical Bulletin 170–141A.

The above data shows that an epoxy casting prepared with a liquid composition of the invention exhibits mechanical properties comparable to a casting prepared from the parent aromatic polyamine.

EXAMPLE 6

Two epoxy resin polymers were prepared using the ingredients and proportions set forth in Table VI following the method of preparation and test procedures of Example 4.

TABLE VI

| Ingredients | Casting (c) | Casting (d) |
|---|---|---|
| DER–331 | 100 | 100 |
| Curative C | 24.7 | |
| 4,4'-methylene dianiline | | 27.2 |
| Physical properties: | | |
| Rockwell hardness, M | 109 | 106 |
| Clash Berg modulus, ° C., $T_E=5\times10^4$ | 156 | 154 |
| Compressive strength, p.s.i. | 17,125 | 18,175 |
| Tensile strength, p.s.i. | 9,200 | 8,200 |
| Elongation, percent | 11 | 10 |
| Dielectric constant 1 megacycle, 73° C. | 3.85 | 3.44 |
| Dissipation factor 1 megacycle, 73° C. | 0.038 | 0.033 |

This data illustrates that at least comparable physical and electrical properties are obtained when epoxy resins are cured with the liquid compositions of the invention as compared with a commercially available aromatic curative. Hardness, Clash Berg Modulus, tensile and elongation properties are better using the composition of the invention.

EXAMPLE 7

This example illustrates the relative reactivity of a storage stable liquid composition of the invention as compared with various commercially available epoxy curatives.

The relative reactivity of the above curatives at a range of reaction temperatures was determined as follows using a Differential Scanning Calorimeter (Model No. DSC–1, Perkin Elmer Corporation, Norwalk, Conn.). Aliquots (15–20 milligrams) of freshly prepared mixtures of epoxy resin (DER–331) and the curative under test were placed on the instrument sample stage after the latter had been preheated to the desired reaction temperature. Initially the temperature recorder of the calorimeter shows an endothermic peak indicating the heat necessary to raise the sample temperature (circa 25° C.), to the temperature of the sample stage. The beginning of this peak was taken as the base line or "zero" time. Once the sample temperature had reached the sample stage temperature an exothermic peak is recorded by the instrument corresponding to the heat evolved in the curing of the epoxy resin.

The time in minutes as measured from "zero" time required for the recorder trace to return 90% of the vertical distance to the base line is taken as a measure of the curing rate of the resin and is inversely proportional to the reactivity of the curative being tested. The 90% return (rather than 100%) is taken in order that the test be not unduly prolonged. The results obtained by this method for various curatives are shown in Table VII.

As an example, from Table VII, using a mixture of epoxy resin and "Curative B" at a reaction temperature of 135° C. the time required for the temperature recorder of the calorimeter to record an exotherm curve and return 90% of the distance to the base line was 11.9 minutes. An epoxy resin cured with "Curative A" (not of the invention) required 23.0 minutes at the same reaction temperature i.e. the reactivity of "Curative A" is markedly less than that of "Curative B."

This data clearly illustrates that the epoxy resins cured with the liquid compositions of the invention require curatives of the art.

TABLE VII

| Ingredients | (e) | (f) | (g) | (h) |
|---|---|---|---|---|
| DER-331 | 100 | 100 | 100 | 100 |
| Curative B | 24.1 | | | |
| Curative A | | 27.0 | | |
| 4,4'-methylene dianiline | | | 26.2 | |
| Triethylene tetramine | | | | 12.9 |
| Curing time 90% completion in minutes | | | | |
| Temperature, ° C. of sample stage: | | | | |
| 135 | 11.9 | 23.0 | 18.5 | 1.75 |
| 150 | 8.32 | 14.2 | 11.5 | 1.27 |
| 175 | 4.84 | 6.64 | 5.51 | (*) |
| 200 | (*) | 3.52 | 2.81 | (*) |

*Less than one minute.

We claim:

1. A composition which is a stable liquid above 5° C. consisting essentially of a mixture of (a) from about 10 to about 40 percent by weight of hexamethylene diamine and (b) from about 90 to about 60 percent by weight of a mixture of methylene polyphenyl polyamines represented by the formula:

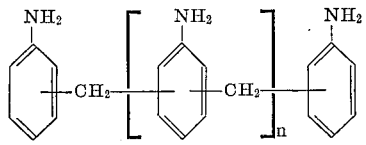

wherein $n$ has an average value from about 0.1 to about 1.0, said mixture of methylene polyphenyl polyamines being further characterized in that it contains from about 35 to about 85 percent by weight of methylene dianilines.

2. The composition of claim 1 wherein said mixture of methylene polyphenyl polyamines contains about 50 percent by weight of methylene dianilines.

3. The composition of claim 1 wherein said mixture of methylene polyphenyl polyamines contains about 68 percent by weight of methylene dianilines.

4. A composition which is a stable liquid above 5° C. consisting essentially of a mixture of (a) from about 15 to about 30 percent by weight of hexamethylene diamine and (b) from about 85 to about 70 percent by weight of a mixture of methylene polyphenyl polyamines represented by the formula

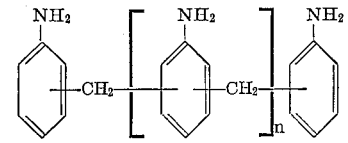

wherein $n$ has an average value from about 0.1 to about 1.0, said mixture of methylene polyphenyl polyamines being further characterized in that it contains from about 35 to about 85 percent by weight of methylene dianilines.

5. The composition of claim 4 wherein said mixture of methylene polyphenyl polyamines contains about 50 percent by weight of methylene dianilines.

References Cited

UNITED STATES PATENTS

| 2,683,730 | 7/1954 | Seeger et al. | 260—453 |
| 2,950,263 | 8/1960 | Abbotson et al. | 260—2.5 |
| 3,379,691 | 4/1968 | Sundholm | 252—182X |

RICHARD D. LOVERING, Primary Examiner

U.S. Cl. X.R.

260—47